(12) United States Patent
Tamura et al.

(10) Patent No.: US 9,762,127 B2
(45) Date of Patent: Sep. 12, 2017

(54) POWER CONVERTER AND POWER CONDITIONER

(71) Applicant: Panasonic Intellectual Property Management Co., Ltd., Osaka (JP)

(72) Inventors: Hideki Tamura, Shiga (JP); Kazunori Kidera, Osaka (JP); Jin Yoshizawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/777,593

(22) PCT Filed: Mar. 11, 2014

(86) PCT No.: PCT/JP2014/001370
§ 371 (c)(1),
(2) Date: Sep. 16, 2015

(87) PCT Pub. No.: WO2014/147998
PCT Pub. Date: Sep. 25, 2014

(65) Prior Publication Data
US 2016/0294290 A1 Oct. 6, 2016

(30) Foreign Application Priority Data
Mar. 18, 2013 (JP) .................................. 2013-055785

(51) Int. Cl.
*H02M 3/335* (2006.01)
*H02J 1/10* (2006.01)
(Continued)

(52) U.S. Cl.
CPC .......... *H02M 3/33507* (2013.01); *H02M 1/08* (2013.01); *H02M 3/1582* (2013.01);
(Continued)

(58) Field of Classification Search
CPC .................. H02M 2001/0067; H02M 3/33523
(Continued)

(56) References Cited

U.S. PATENT DOCUMENTS 7,848,118 B2* 12/2010 Shimada .......... H02M 3/33584
363/127
2003/0128556 A1 7/2003 Zhang
(Continued)

FOREIGN PATENT DOCUMENTS

JP 2001-037226 A 2/2001
JP 2007-006653 A 1/2007
(Continued)

OTHER PUBLICATIONS

International Search Report for corresponding International Application No. PCT/JP2014/001370 mailed May 20, 2014.
(Continued)

*Primary Examiner* — Adolf Berhane
*Assistant Examiner* — Gary Nash
(74) *Attorney, Agent, or Firm* — Renner, Otto, Boisselle & Sklar, LLP

(57) ABSTRACT

A power converter 1 includes a first conversion circuit 10 connected with a first winding n1 of a transformer 40, and a second conversion circuit 20 connected with a second winding n2 of the transformer 40. The first and second conversion circuits 10 and 20 are configured to perform bidirectional power conversion. The power converter further includes a third conversion circuit 30 that is a circuit provided at a pre-stage of the first conversion circuit 10 in a direction of transferring electric power toward the second conversion circuit 20 from the first conversion circuit 10. The third conversion circuit 30 is configured to perform bidirectional power conversion, and function as a boosting chopper circuit upon transferring electric power toward the second conversion circuit 20 from the first conversion circuit 10.

15 Claims, 11 Drawing Sheets

(51) Int. Cl.
*H02M 1/00* (2006.01)
*H02M 7/00* (2006.01)
*H02M 3/158* (2006.01)
*H02M 1/08* (2006.01)

(52) U.S. Cl.
CPC .. *H02M 3/33584* (2013.01); *H02M 2001/007* (2013.01); *H02M 2001/0009* (2013.01)

(58) Field of Classification Search
USPC ......... 363/21.02, 65, 67–70, 78, 84, 95, 124
See application file for complete search history.

(56) References Cited

U.S. PATENT DOCUMENTS

2006/0285368 A1* 12/2006 Schlecht .............. H02M 3/335
363/21.06
2008/0055941 A1* 3/2008 Victor .................. H02M 3/158
363/17
2008/0198632 A1* 8/2008 Takayanagi ........... H02M 7/797
363/17
2011/0037319 A1 2/2011 Matsui et al.
2011/0090717 A1* 4/2011 Lee .................. H02M 3/33584
363/21.02

FOREIGN PATENT DOCUMENTS

| JP | 2008-099395 A | 4/2008 |
| JP | 2009-177940 A | 8/2009 |
| JP | 2009-261186 A | 11/2009 |
| WO | WO 2013/035801 A1 | 3/2015 |

OTHER PUBLICATIONS

Form PCT/ISA/237 for corresponding International Application No. PCT/JP2014/001370 dated May 20, 2014.
Extended European Search Report for corresponding European patent Application No. 14767695.1 mailed Feb. 3, 2017.

* cited by examiner

POWER CONVERTER AND POWER CONDITIONER

TECHNICAL FIELD

The invention relates generally to power converters and power conditioners, and, more particularly, to a power converter that includes a transformer between two conversion circuits for performing power conversion, and a power conditioner using the power converter.

BACKGROUND ART

Conventionally, there has been known a power converter that includes a transformer between two conversion circuits for performing power conversion, as a kind of power converter that performs bidirectional DC/DC conversion, or performs bidirectional DC/AC conversion (e.g., refer to JP 2009-177940 A (hereinafter, referred to as "Document 1")).

As shown in FIG. 12, the power converter in Document 1 includes a transformer 401 between a primary-side DC/AC conversion part 101 and a secondary-side DC/AC conversion part 201. In addition, the power converter has a configuration that a boosting circuit 301 is connected with the secondary-side DC/AC conversion part 201. This power converter is configured to bidirectionally perform DC/DC power conversion. Each of the primary-side DC/AC conversion part 101, the secondary-side DC/AC conversion part 201 and the boosting circuit 301 is configured to perform bidirectional power conversion.

The configuration described in Document 1 has a function that suppresses a reduction of a voltage value between a battery B11 having a low nominal voltage and a battery B12 having a high nominal voltage, by supplying energy to one of the batteries from the other when a voltage value of the one is reduced. In Document 1, the boosting circuit 301 is connected with the secondary-side DC/AC conversion part 201, because the battery B11 having the low nominal voltage is connected with the primary-side DC/AC conversion part 101, and the battery B12 having the high nominal voltage is connected with the boosting circuit 301.

The transformer 401 has a turn ratio between the numbers of turns of windings, which is set according to a voltage ratio between voltages of the batteries B11 and B12. Accordingly, voltage values of the batteries B11 and B12 fluctuate. Therefore, if the turn ratio of the transformer 401 has been set according to the voltage ratio at voltage step-down, it may be impossible to obtain the voltage ratio at voltage step-up with only the transformer 401. In order to solve the shortage of a voltage value at the voltage step-up, the boosting circuit 301 is installed. Furthermore, Document 1 discloses that the boosting circuit is connected with a load, instead of the battery B12.

The circuit referred to as the boosting circuit 301 functions as a boosting chopper circuit at the voltage step-up of supplying energy from the battery B11 to the battery B12, and as a step-down chopper circuit at the voltage step-down of supplying energy from the battery B12 to the battery B11.

Now, as shown in FIG. 2, it is assumed that the nominal voltage of the battery B11 is selected from a relatively-wide range as a characteristic T1, and a range in which the voltage value of the battery B12 varies is relatively-narrow as a characteristic T2. In FIG. 2, a range between top and bottom ends of each vertical bar corresponds to a voltage range. Here, it is assumed that the range of the voltage value of the battery B12 is within a range of the selectable voltage value for the battery B11. As a case where such a condition is satisfied, for example it is considered that the battery B11 is a storage battery installed in a motor vehicle such as an electric vehicle, and the battery B12 is a storage battery for supplying electric power to facility apparatuses to be used in a home.

In the configuration described in Document 1, since the boosting circuit 301 is operated as a boosting chopper circuit upon supplying energy from the battery B11 to the battery B12, the maximum value of an input voltage of the boosting circuit 301 needs to be set lower than the voltage value of the battery B12. In other words, a relatively-large current flows through an input side of the boosting circuit 301, and therefore there is a problem that a relatively-large loss occurs as the whole of the power converter.

On the other hand, since the power converter in Document 1 can perform bidirectional power conversion, it is considered that the voltage values of the batteries B11 and B12 are set to have a relation opposite to that shown in FIG. 2. In other words, it is considered that the voltage value of the battery B11 is selected from a relatively-narrow range, and the range of the selectable voltage value for the battery B11 is within a range of the selectable voltage value for the battery B12.

In this configuration, since the boosting circuit 301 is operated as a step-down chopper circuit upon supplying energy from the battery B12 to the battery B11, the voltage value output from the boosting circuit 301 becomes lower than the voltage value of the battery B11. In other words, the transformer 401 needs to perform the voltage step-up toward the primary-side DC/AC conversion part 101 from the secondary-side DC/AC conversion part 201.

Since the secondary-side DC/AC conversion part 201 is operated at a relatively-low voltage value stepped-down by the boosting circuit 301, a relatively-large current flows through the windings of the transformer 401, and a relatively-large loss may occur as the whole of the power converter.

DISCLOSURE OF THE INVENTION

It is an object of the invention to provide a power converter which can enhance conversion efficiency, and further provide a bidirectional converter and a power conditioner, using the power converter.

A power converter according to an aspect of the invention includes a first conversion circuit, a second conversion circuit, a transformer, and a third conversion circuit. The first conversion circuit and the second conversion circuit are configured to perform electric power conversion. The transformer is for transferring electric power between the first and second conversion circuits. The third conversion circuit is a circuit provided at a pre-stage of the first conversion circuit in a direction of transferring electric power toward the second conversion circuit from the first conversion circuit. The third conversion circuit is configured to perform voltage conversion such that a voltage to be input to the first conversion circuit is higher than a voltage to be output from the second conversion circuit.

In the power converter, it is preferred that each of the first and second conversion circuits be configured to perform bidirectional DC/AC power conversion, and the third conversion circuit be configured to operate as a boosting chopper circuit during a time period of transferring electric power toward the second conversion circuit from the first conversion circuit. It is preferred that the third conversion circuit be configured to operate as a step-down chopper circuit during a time period of transferring electric power toward the first conversion circuit from the second conversion circuit.

It is preferred that the power converter further include a control circuit, and each of the first and second conversion circuits include a switch element and be configured to perform the electric power conversion by the control circuit controlling switching of the switch element. The third conversion circuit preferably includes: two first terminals connected with the first conversion circuit; two second terminals; a series circuit formed of a first switch element and a second switch element, and connected between the two first terminals; and a series circuit formed of an inductor and the first switch element, and connected between the two second terminals. One ends of the first switch element, the second switch element and the inductor are preferably connected with one another. The control circuit is preferably configured to control on/off of the first switch element upon transferring electric power toward the second conversion circuit from the first conversion circuit. The control circuit is preferably configured to control on/off of the second switch element upon transferring electric power toward the first conversion circuit from the second conversion circuit.

In the power converter, it is preferred that the first and second conversion circuits be subjected to switching control at a same timing.

In the power converter, it is preferred that during the time period of transferring electric power toward the first conversion circuit from the second conversion circuit, the on/off of the second switch element be synchronized with the switching control to which the first and second conversion circuits are subjected, and the on/off of the second switch element have a cycle that is 1/(an even number) of a cycle of the switching control.

In the power converter, it is preferred that during the time period of transferring electric power toward the first conversion circuit from the second conversion circuit, the on/off of the second switch element be synchronized with the switching control to which the first and second conversion circuits are subjected, and the on/off of the second switch element have a cycle that is an even multiple of a cycle of the switching control.

In the power converter, it is preferred that during the time period of transferring electric power toward the first conversion circuit from the second conversion circuit, the on/off of the second switch element have a cycle that is equal to a synchronization cycle of switching control to which the first conversion circuit is subjected, and the cycle of the on/off of the second switch element and the synchronization cycle of the switching control have phases different by 90 degrees.

It is preferred that the power converter further include a control circuit, and each of the first and second conversion circuits include a switch element and be configured to perform the electric power conversion by the control circuit controlling switching of the switch element. The third conversion circuit preferably includes: two first terminals connected with the first conversion circuit; two second terminals; a series circuit formed of a first switch element and a second switch element, and connected between the two first terminals; a series circuit formed of a first inductor and the first switch element, and connected between the two second terminals; a series circuit formed of a third switch element and a fourth switch element, and connected between the two first terminals; and a series circuit formed of a second inductor and the third switch element, and connected between the two second terminals. One ends of the first switch element, the second switch element and the first inductor are preferably connected with one another. One ends of the third switch element, the fourth switch element and the second inductor are preferably connected with one another. The control circuit is preferably configured to control on/off of the first and third switch elements upon transferring electric power toward the second conversion circuit from the first conversion circuit. The control circuit is preferably configured to control on/off of the second and fourth switch elements such that an ON period and an OFF period of the second switch element have a relation opposite to a relation of an ON period and an OFF period of the fourth switch element upon transferring electric power toward the first conversion circuit from the second conversion circuit.

In the power converter, it is preferred that each of the first and second conversion circuits be configured to increase a duty ratio for the switching control in accordance with a lapse of time during a prescribed period immediately after started.

In the power converter, it is preferred that the third conversion circuit be subjected to feedback control to keep constant the voltage to be output from the second conversion circuit, when inputting electric power to the first conversion circuit such that electric power is output from the second conversion circuit.

A power conditioner according to an aspect of the invention includes any one of the above-mentioned power converters, and a fourth conversion circuit connected with the second conversion circuit of the power converter. The fourth conversion circuit is configured to perform bidirectional DC/AC power conversion.

According to the configuration of the invention, because a voltage to be applied to the first conversion circuit is boosted by the third conversion circuit, a voltage to be applied to the transformer becomes high even when a range of a voltage to be applied to the third conversion circuit is wide. A current flowing through windings of the transformer therefore becomes relatively small. It is accordingly possible to reduce a loss due to the transformer, and enhance conversion efficiency as the whole of the power converter.

BRIEF DESCRIPTION OF THE DRAWINGS

Preferred embodiments of the invention will now be described in further details. Other features and advantages of the invention will become better understood with regard to the following detailed description and accompanying drawings where.

EMBODIMENT FOR CARRYING OUT THE INVENTION

Embodiment 1

Figure 1:
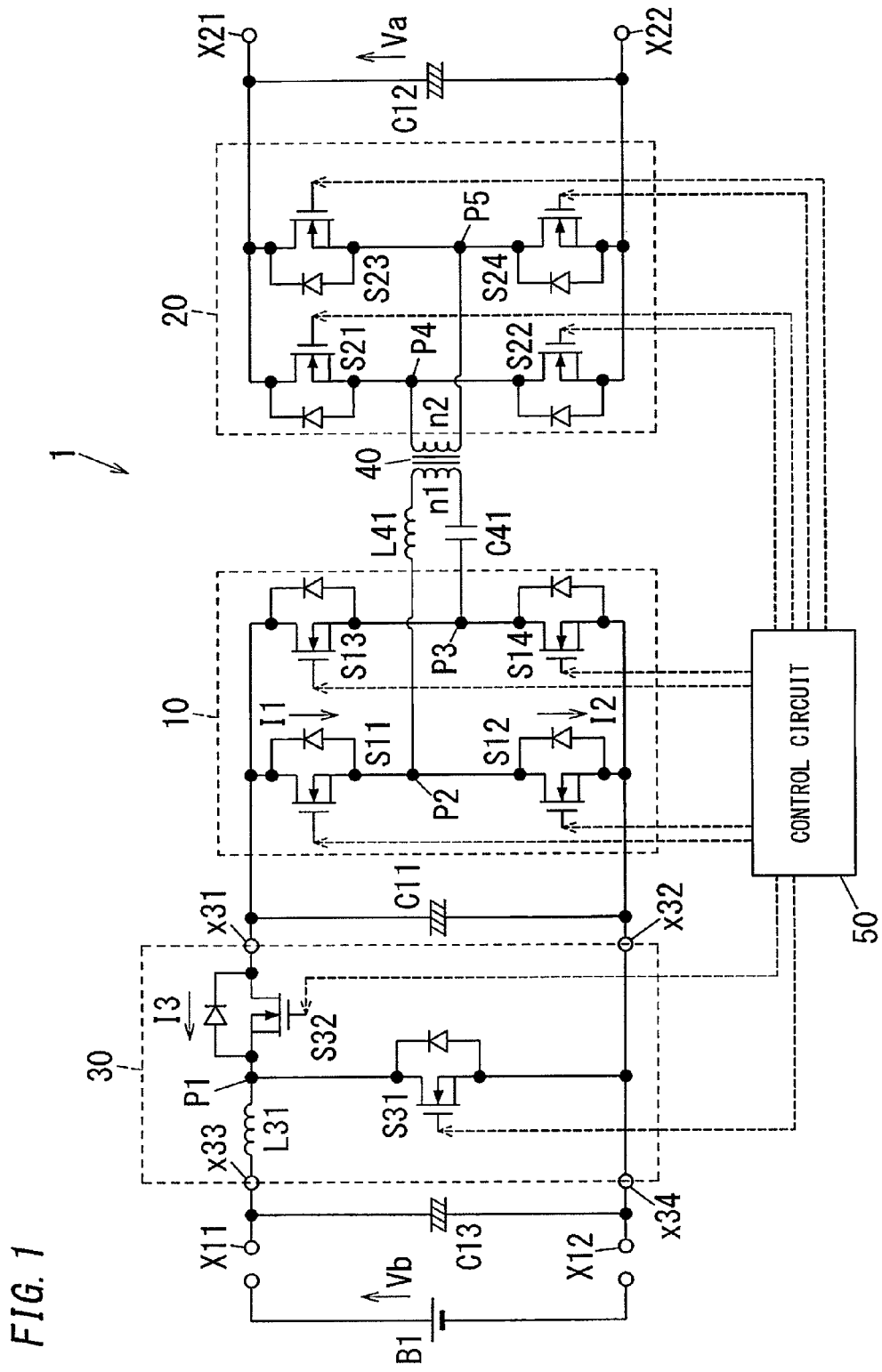
FIG. 1 is a circuit diagram illustrating a power converter according to Embodiment 1.

As shown in FIG. 1, a power converter 1 of the present embodiment includes a first conversion circuit 10 and a second conversion circuit 20 that are configured to perform electric power conversion. Between the first and second conversion circuits 10 and 20, a transformer 40 is connected. Each of the first and second conversion circuits 10 and 20 is configured to transfer electric power via the transformer 40. The power converter 1 further includes a third conversion circuit 30 connected with connection terminals of the first conversion circuit 10 on a DC side thereof.

Each of the first and second conversion circuits 10 and 20 is configured to perform bidirectional DC/AC power conversion. In other words, the first and second conversion circuits 10 and 20 and the transformer 40 constitute a conversion circuit that is configured to perform bidirectional DC/DC power conversion as the whole.

The third conversion circuit 30 is a circuit provided at a pre-stage of the first conversion circuit 10 in a direction of transferring electric power toward the second conversion circuit 20 from the first conversion circuit 10. The third conversion circuit 30 is configured to perform voltage conversion such that a voltage to be input to the first conversion circuit 10 is higher than a voltage to be output from the second conversion circuit 20. The third conversion circuit 30 is configured to step-down a voltage output from the first conversion circuit 10 upon transferring electric power toward the first conversion circuit 10 from the second conversion circuit 20.

In other words, the power converter 1 includes: a bidirectional DC-DC conversion circuit including the first and second conversion circuits 10 and 20 and the transformer 40; and a bidirectional chopper circuit for voltage conversion, including the third conversion circuit 30. Note that, a voltage is also adjusted by a turn ratio between the numbers of turns of windings of the transformer 40.

In the illustrated example, the first conversion circuit 10 includes a bridge circuit with four switch elements S11 to S14. The second conversion circuit 20 similarly includes a bridge circuit with four switch elements S21 to S24. Each of the first and second conversion circuits 10 and 20 is configured to perform the electric power conversion by switching of the switch elements of the bridge circuit thereof.

The first conversion circuit 10 includes an arm formed of two switch elements S11 and S12 connected in series, and an arm formed of two switch elements S13 and S14 connected in series. The arm formed of the switch elements S11 and S12 is connected in parallel with the arm formed of the switch elements S13 and S14.

The second conversion circuit 20 similarly includes an arm formed of two switch elements S21 and S22 connected in series, and an arm formed of two switch elements S23 and S24 connected in series. The arm formed of the switch elements S21 and S22 is connected in parallel with the arm formed of the switch elements S23 and S24.

The third conversion circuit 30 includes: two switch elements S31 and S32 connected in series; and an inductor L31 having one end connected with a connection point P1 of the switch elements S31 and S32. In the present embodiment, the switch element S31 corresponds to a first switch element, and the switch element S32 corresponds to a second switch element. The third conversion circuit 30 includes: first terminals x31 and x32 respectively at both ends of a series circuit of the two switch elements S31 and S32, connected with the first conversion circuit 10; and second terminals x33 and x34 respectively at both ends of a series circuit of the switch element S31 and the inductor L31.

In the first conversion circuit 10, a series circuit of a first winding n1 of the transformer 40, an inductor L41 and a capacitor C41 is connected between a connection point P2 of the two switch elements S11 and S12, and a connection point P3 of the two switch elements S13 and S14. In the second conversion circuit 20, a second winding n2 of the transformer 40 is connected between a connection point P4 of the two switch elements S21 and S22, and a connection point P5 of the two switch elements S23 and S24. The inductor L41 and the capacitor C41 constitute a serial resonance circuit, a resonance frequency of which is set to be almost equal to a frequency that is transferred between the first conversion circuit 10 and the second conversion circuit 20.

A capacitor C11 is connected in parallel with the above mentioned two arms of the first conversion circuit 10. The capacitor C11 is connected to the first terminals x31 and x32 of the third conversion circuit 30. A capacitor C12 is connected in parallel with the above mentioned two arms of the second conversion circuit 20. Further, a capacitor C13 is connected between both ends of a series circuit of the switch element S31 and the inductor L31 in the third conversion circuit 30.

As shown in FIG. 1, on/off control of the switch elements S11 to S14, S21 to S24, S31 and S32 is performed by a control circuit 50 at a timing described later. As the switch elements S11 to S14, S21 to S24, S31 and S32, MOSFETs or a configuration in combination of bipolar transistors and diodes may be used in a case where an ON-OFF period is short. Alternatively, the switch elements S11 to S14, S21 to S24, S31 and S32 may be IGBTs (Insulated Gate Bipolar Transistors) in a case where an ON-OFF period is relatively long.

As semiconductor material for the switch elements S11 to S14, S21 to S24, S31 and S32, Si is widely used, but wide band gap semiconductor material such as SiC or GaN is also sometimes used. When the wide band gap semiconductor material is used for the switch elements S11 to S14, S21 to S24, S31 and S32, diodes with good recovery characteristics are respectively connected in parallel with the switch elements like the case of the bipolar transistors.

However, when the wide band gap semiconductor material is used for the switch elements S11 to S14, S21 to S24, S31 and S32, the cost may be increased. In the present embodiment, the inductor L41 and the capacitor C41 are installed between the first conversion circuit 10 and the transformer 40, and the switch elements S11 to S14 are subjected to soft switching in order to reduce the loss, using inexpensive Si.

Hereinafter, both ends of the capacitor C13 are referred to as first connection terminals X11 and X12, and both ends of the capacitor C12 are referred to as second connection terminals X21 and X22, respectively. The first connection terminals X11 and X12 correspond to the second terminals x33 and x34 of the third conversion circuit 30, respectively. As an example, it is assumed that the first connection terminals X11 and X12 are connected to a battery B1 installed in a motor vehicle such as an electric vehicle, and the second connection terminals X21 and X22 are connected to a DC bus (not shown). Further, it is assumed that although nominal voltages of batteries B1 vary from one type of motor vehicle to another type of motor vehicle, a line voltage of the DC bus does not vary largely.

Figure 2:
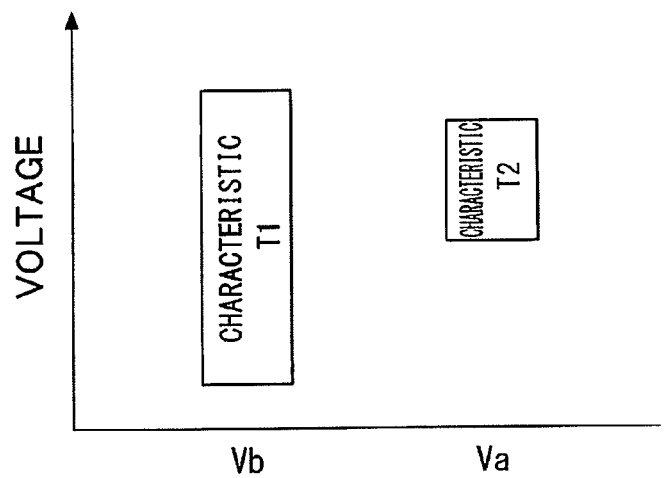
FIG. 2 is a diagram illustrating a relation between voltages before and after power conversion by a power converter.

In other words, it is assumed that a nominal voltage Vb of the battery B1 is selected from a wide range as a characteristic T1 shown in FIG. 2, and a line voltage Va of the DC bus varies within a narrow range as a characteristic T2 shown in FIG. 2. In FIG. 2, a range between top and bottom ends of each vertical bar corresponds to a voltage range. Further, a condition is set, where the range of the line voltage Va of the DC bus is within the range of the nominal voltage Vb of the battery B1. The satisfaction of the condition is not necessary, and an example for merely indicating that the technique of the present embodiment can be adapted even in the case where the selectable range of the nominal voltage Vb of the battery B1 is wider than the range of the line voltage Va of the DC bus.

(Discharging Operation)

The power converter 1 with the above mentioned configuration performs the bidirectional DC/DC power conversion through an operation described below. First, an operation upon discharging of the battery B1 will be described. In other words, it is an operation upon transferring electric power toward the second conversion circuit 20 from the first conversion circuit 10, and the operation for supplying the power of the battery B1 to the DC bus will be described.

Since the battery B1 is connected to the first connection terminals X11 and X12, a voltage across the capacitor C13 (i.e., a potential difference between both ends of the capacitor) is equal to a terminal voltage of the battery B1 (i.e., a potential difference between both ends of the battery). In this case, the third conversion circuit 30 operates as a boosting chopper circuit. In other words, the switch element S31 is subjected to on/off switching, and the switch element S32 is kept in OFF state.

The third conversion circuit 30 stores energy in the inductor L31 for a period during which the switch element S31 is in ON state. The energy stored in the inductor L31 is discharged through a body diode of the switch element S32 for a period during which the switch element S31 is in OFF state. Accordingly, when the third conversion circuit 30 operates, a voltage across the capacitor C11 is boosted with respect to a voltage between the first connection terminals X11 and X12 (i.e., a potential difference between the two first connection terminals X11 and X12). The switch element S32 is kept in OFF state, while the switch element S31 is switched on/off. Thus, the capacitor C11 is charged with a current flowing through the body diode (parasitic diode) of the switch element S32. Alternatively, synchronous rectification may be performed, where the switch element S32 is switched on for a period during which the switch element S31 is in OFF state.

In the period during which the third conversion circuit 30 operates as the boosting chopper circuit, the switch element S31 is subjected to the PWM (Pulse Width Modulation) control, and accordingly an ON-OFF period thereof is adjusted and a boosting ratio is adjusted in response to the duty ratio. Therefore, the voltage across the capacitor C11 can be adjusted by the ON-OFF period of the switch element S31 being adjusted.

In the present embodiment, the third conversion circuit 30 is designed such that the voltage across the capacitor C11 is higher than the line voltage of the DC bus. Since the terminal voltage of the battery B1 and the line voltage of the DC bus have a relation shown in FIG. 2, there are two cases: a case where the terminal voltage of the battery B1 is higher than the line voltage of the DC bus; and a case where the terminal voltage of the battery B1 is lower than the line voltage of the DC bus.

In the case where the terminal voltage of the battery B1 is lower than the line voltage of the DC bus, the duty ratio for the switching of the switch element S31 is adjusted such that the voltage across the capacitor C11 is higher than the line voltage of the DC bus. On the other hand, in the case where the terminal voltage of the battery B1 is higher than the line voltage of the DC bus, the duty ratio for the switching of the switch element S31 is adjusted to such an extent that the voltage across the capacitor C11 does not largely exceed the line voltage of the DC bus.

It is desirable that the duty ratio for the switching of the switch element S31 be adjusted by performing the feedback control to keep constant a voltage to be output from the second conversion circuit 20. In other words, the feedback control is performed so as to keep constant a voltage across the capacitor C12. According to this configuration, it is possible to keep constant an output voltage of the second connection terminals X21 and X22 even when variation in the characteristics of the first conversion circuit 10, the second conversion circuit 20 and the transformer 40 exists on every product. That is, the control circuit 50 monitors the voltage across the capacitor C12, and adjusts the duty ratio for the switching of the switch element S31 such that the monitoring voltage is kept constant.

Figure 3:
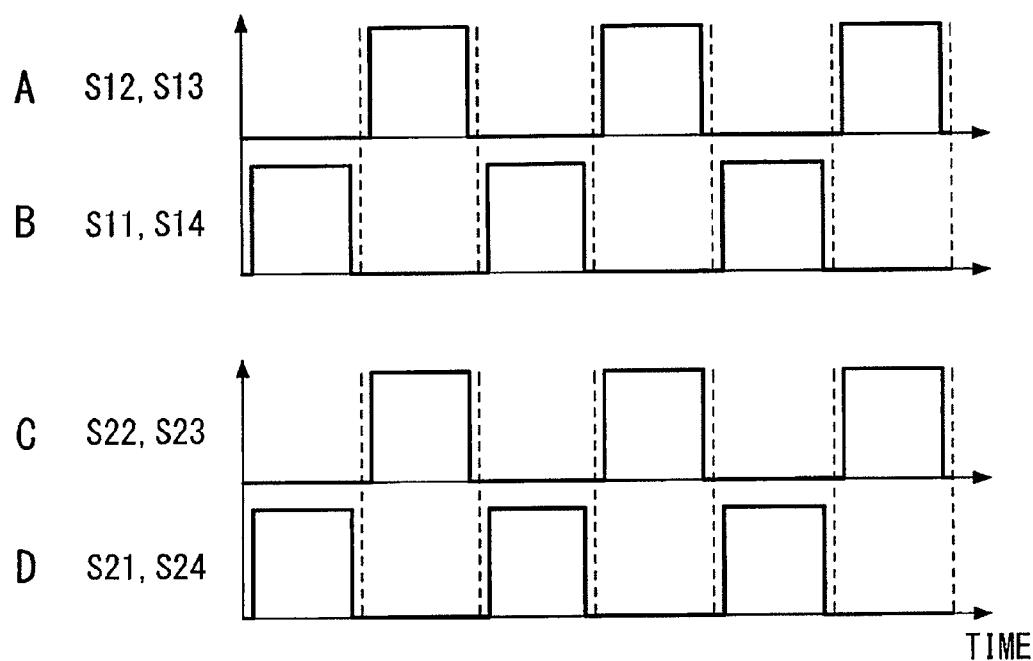
FIG. 3 (A to D of FIG. 3) is an operation explanatory drawing for the power converter according to Embodiment 1.

DC power taken out from both ends of the capacitor C11 is converted to AC power by the first conversion circuit 10. In other words, on/off of the switch elements S11 to S14 in the first conversion circuit 10 is controlled by the control circuit 50, for example, as shown in A and B of FIG. 3. In FIG. 3, A shows the on/off operation of the switch elements S12 and S13, and in FIG. 3, B shows the on/off operation of the switch elements S11 and S14.

Here, a positional relation between the switch elements S11 and S14 is referred to as diagonal positions, and also a positional relation between the switch elements S12 and S13 is referred to as another diagonal positions. In the example of A and B of FIG. 3, switch elements at diagonal positions are simultaneously turned on. That is, the control circuit 50 controls the on/off of the switch elements S11 to S14 such that the switch elements S11 and S14 are simultaneously turned on, and the switch elements S12 and S13 are simultaneously turned on.

However, two switch elements of the same arm are prohibited from being simultaneously turned on. That is, the control circuit 50 controls the on/off of the switch elements S11 to S14 such that the switch elements S11 and S12 are not simultaneously turned on, and the switch elements S13 and S14 are not simultaneously turned on.

In the illustrated example, a pause period is provided when switching on/off of a high-side switch element and a low-side switch element of the same arm, and both of the switch elements are simultaneously turned off during the pause period. That is, a pause period is provided when switching on/off of the switch elements S11 and S12, and a pause period is also provided when switching on/off of the switch elements S13 and S14.

In the operation example of A and B of FIG. 3, two switch elements at diagonal positions are simultaneously turned on. However, as long as a period during which the switch elements at the diagonal positions are simultaneously in ON state is provided, namely, ON periods of the switch elements overlapping with each other exist even a little bit, the timings at which the switch elements are turned on may be different from each other.

According to the above-mentioned operation, an AC current flows through the first winding n1 of the transformer 40 in response to the on/off switching of the switch elements S11 to S14, and accordingly, an AC current is taken out from the second winding n2 of the transformer 40. Thus, the turn ratio between the numbers of turns of the first and second windings n1 and n2 is set such that the line voltage of the DC bus becomes a required voltage, when the third conversion circuit 30 operates as a boosting chopper circuit and a voltage across the first winding n1 is a prescribed voltage higher than the terminal voltage of the battery B1.

In the second conversion circuit 20, when the switch elements S21 to S24 are kept in OFF state upon discharging of the battery B1, the full-wave rectification is performed by a diode bridge formed of body diodes of the switch elements S21 to S24.

However, in the present embodiment, the switch elements S21 to S24 of the second conversion circuit 20 and the switch elements S11 to S14 of the first conversion circuit 10 are on/off-controlled by the control circuit 50 at the same timing, as shown in A to D of FIG. 3. In other words, the switch elements S21 and S24 are controlled to be in ON state for a period when the switch elements S11 and S14 are in ON state, and also the switch elements S22 and S23 are controlled to be in ON state for a period when the switch elements S12 and S13 are in ON state.

Thus, the first and second conversion circuits 10 and 20 do not need to be individually controlled and the control is facilitated, by making the timing of on/off of the switch elements S11 to S14 agree with the timing of on/off of the switch elements S21 to S24. In other words, it is possible to control the switch elements S11 to S14 and S21 to S24 with the same signal, and the control circuit 50 can have a simple configuration.

By synchronizing the first conversion circuit 10 with the second conversion circuit 20 as described above, the loss can be more reduced, compared with the case of using a diode bridge formed of body diodes.

(Charging Operation)

Next, an operation upon charging of the battery B1 with the electric power received from the DC bus will be described. In other words, an operation upon transferring electric power toward the first conversion circuit 10 from the second conversion circuit 20 will be described. In the case of charging the battery B1, the third conversion circuit 30 operates as a step-down chopper circuit. The switch element S32 is subjected to on/off switching, and the switch element S31 is kept in OFF state.

The third conversion circuit 30 stores energy in the inductor L31 for a period during which the switch element S32 is in ON state. The energy stored in the inductor L31 is discharged through a body diode of the switch element S31 for a period during which the switch element S32 is in OFF state. Accordingly, when the third conversion circuit 30 operates, a voltage across the capacitor C13 becomes a voltage to which a voltage across the capacitor C11 is stepped down.

In the period during which the third conversion circuit 30 operates as the step-down chopper circuit, the switch element S32 is subjected to the PWM control, and accordingly the duty ratio is adjusted, and a step-down ratio is adjusted in response to the duty ratio. The first and second conversion circuits 10 and 20 operate similarly to the case of where the battery B1 is discharged. In the period during which the third conversion circuit 30 operates as the step-down chopper circuit, electric power is supplied from the DC bus to the battery B1.

In a period during which the battery B1 is charged, the control circuit 50 adjusts ON period of at least one of two group: the switch elements S11 to S14 in the first conversion circuit 10; and the switch elements S21 to S24 in the second conversion circuit 20, in order to adjust a current with which the battery B1 is charged. The current with which the battery B1 is charged is monitored by a current sensor (not shown). Since the technique for controlling the charging current is well known and not important, the explanation thereof is omitted. In the period during which the battery B1 is charged, the control circuit 50 further monitors the terminal voltage of the battery B1, and adjusts the duty ratio for switching of the switch element S32 in the third conversion circuit 30 based on the monitoring terminal voltage.

Here in the case of charging the battery B1, when the operation of the third conversion circuit 30 is synchronized with the operation of the first conversion circuit 10 (the operation of the second conversion circuit 20 may be also included), in below it is discussed about currents flowing through the switch elements S11 to S14 and S32. As shown in A of FIG. 4, it is assumed that the duty ratio for switching of the switch element S32 in the third conversion circuit 30 is 50%. As shown in D of FIG. 4, in ON periods a current I3 flowing through the switch element S32 is dominated by a current flowing through the inductor L31, and in OFF periods as a matter of course it is stopped.

Figure 4:
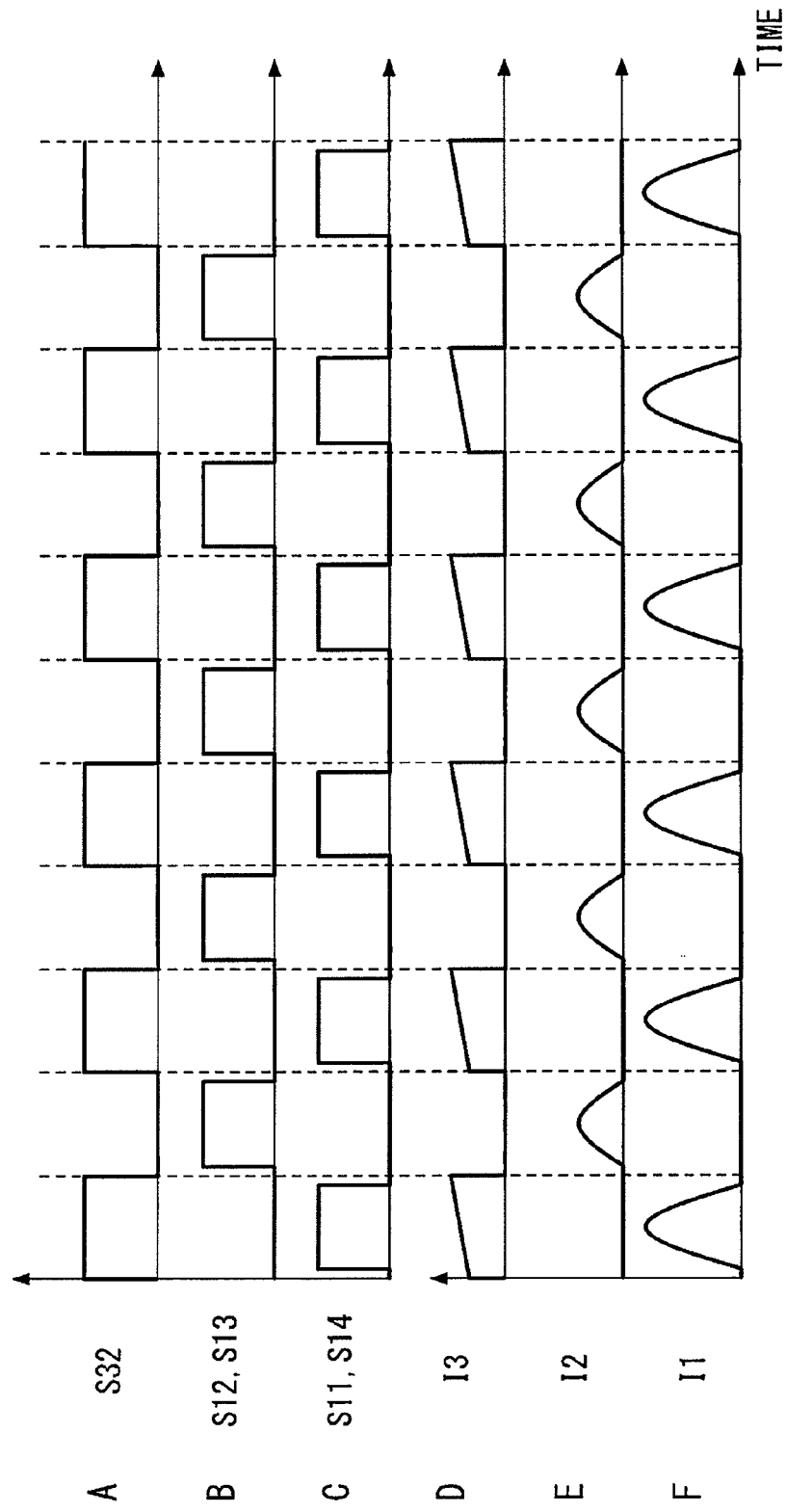
FIG. 4 (A to F of FIG. 4) is an explanatory drawing for an operation example of the power converter according to Embodiment 1.

Here as shown in B and C of FIG. 4, the case is assumed, where periods during which the switch elements S11 to S14 in the first conversion circuit 10 are in ON state are within any of: periods during which the switch element S32 is in ON state; and periods in OFF state. In the illustrated example, periods during which the switch elements S12 and S13 are in ON state are within only periods during which the switch element S32 is in OFF state, and periods during which the switch elements S11 and S14 are in ON state are within only periods during which the switch element S32 is in ON state.

Accordingly, the switch element S32 is in ON state for periods during which a current I1 flows through the switch element S11, however, the switch element S32 is in OFF state for periods during which a current I2 flows through the switch element S12. For this reason, a load on the first conversion circuit 10 varies, when comparing it for the periods during which the switch element S11 is in ON state with it for the periods during which the switch element S12 is in ON state.

That is, as shown in E and F of FIG. 4, a peak value of the current I1 flowing through the switch element S11 is larger than that of the current I2 flowing through the switch element S12. In other words, the switch elements S11 and S14 are required to have current capacities larger than those of the switch elements S12 and S13. As a result, the manufacturing cost of a power converter may be increased.

Figure 5:
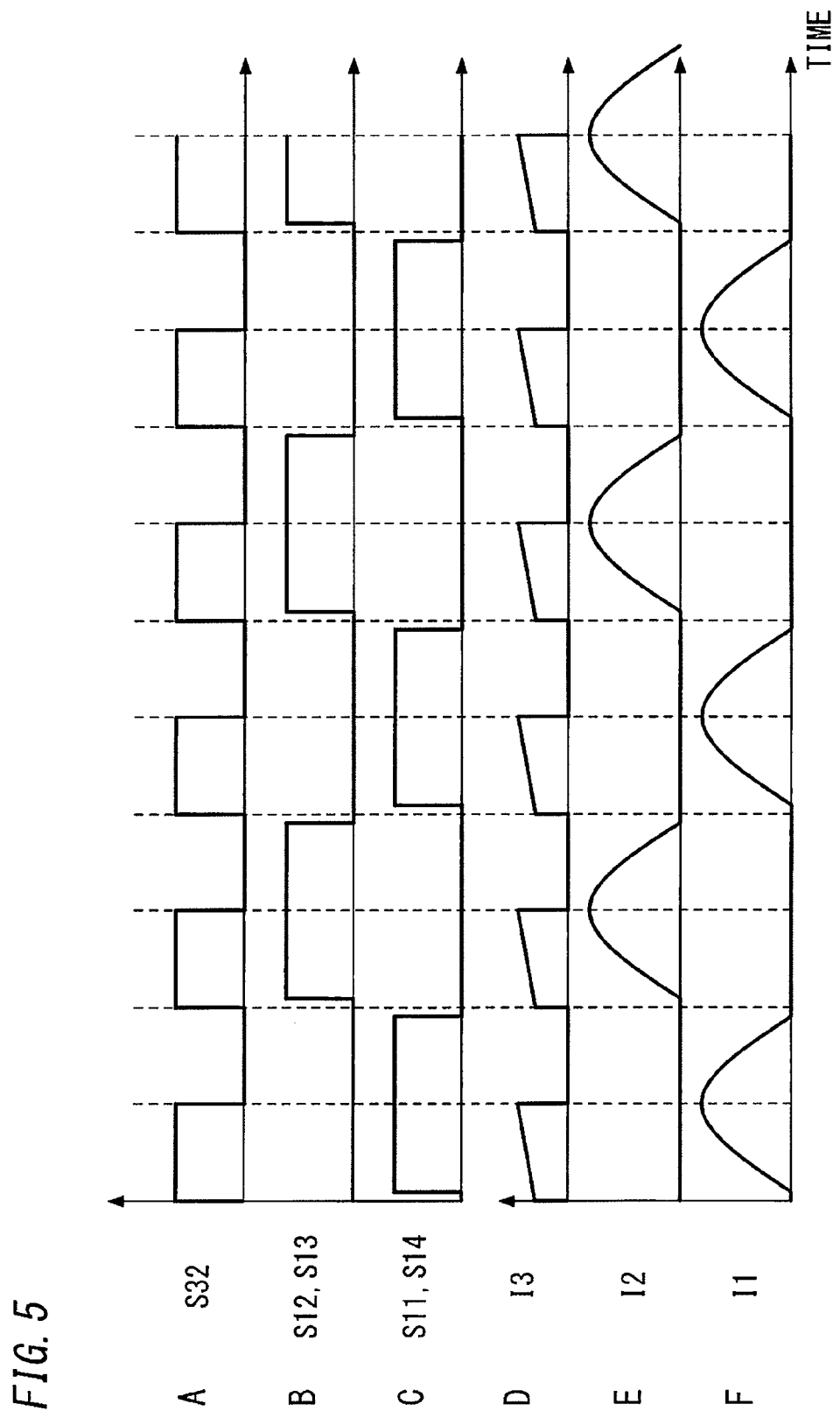
FIG. 5 (A to F of FIG. 5) is an explanatory drawing for another operation example of the power converter according to Embodiment 1.
Figure 6:
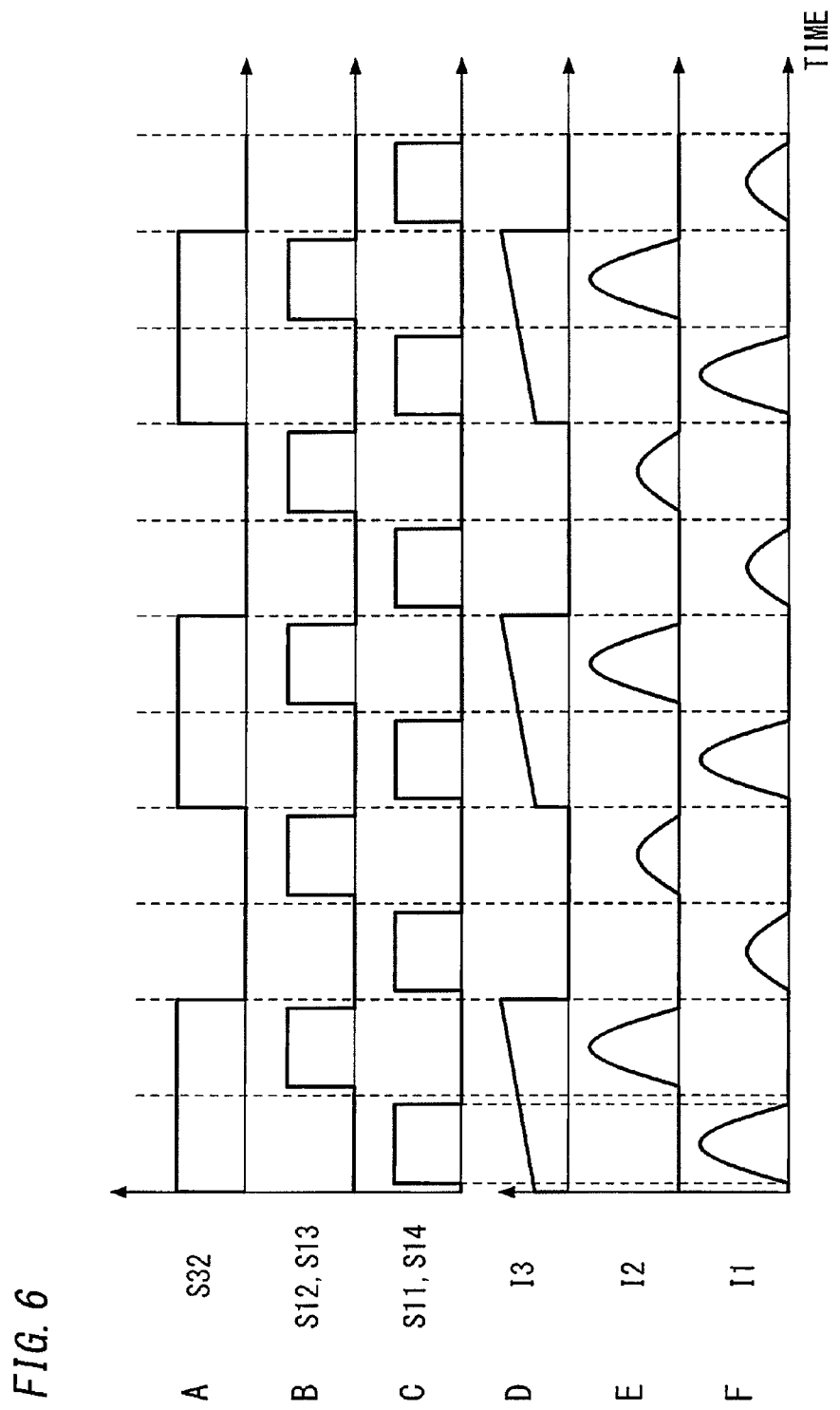
FIG. 6 (A to F of FIG. 6) is an explanatory drawing for still another operation example of the power converter according to Embodiment 1.

In order to solve the above issue, in the present embodiment, the timing of on/off of the switch element S32 and the timing of on/off of the switch elements S11 to S14 are set to have a relation shown in A to F of FIG. 5, or A to F of FIG. 6.

As the operation shown in A to F of FIG. 5, the control circuit 50 sets a cycle of the on/off of the switch element S32 to ½ of a cycle of the on/off of the switch elements S11 to S14. In other words, if a cycle of the on/off of the switch element S32 shown in A of FIG. 5 is the same as the operation shown in A of FIG. 4, a cycle of the on/off of the switch elements S11 to S14 shown in B and C of FIG. 5 is twice the cycle of the on/off of the switch element S32. In the present embodiment, the switch elements S21 to S24 are subjected to on/off switching at the same timing as the switch elements S11 to S14, although not shown. Accordingly, a cycle of the on/off of the switch elements S21 to S24 is also twice the cycle of the on/off of the switch element S32.

In this operation, as shown in D of FIG. 5, the current I3 flowing through the switch element S32 varies similarly to the operation shown in D of FIG. 4, and as shown in E and F of FIG. 5, a peak value of the current I1 flowing through the switch element S11 is almost equal to a peak value of the current I2 flowing through the switch element S12. This is caused by the on/off switching of the switch element S32 being performed one time for each of an ON period of the switch element S11 and an ON period of the switch element S12. In other words, this is caused by the magnitude of a load on the first conversion circuit 10 due to the third conversion circuit 30 for the ON period of the switch element S11 being equal to that for the ON period of the switch element S12.

As apparent from the above-mentioned operation, the cycle of the on/off of the switch element S32 is not limited to ½ of the cycle of the on/off of the switch elements S11 to S14, as long as it is 1/(an even number) of the cycle of the on/off of the switch elements S11 to S14.

In the operation shown in A to C of FIG. 5, the cycle of the on/off of the switch element S32 is shorter than the cycle of the on/off of the switch elements S11 to S14. On the other hand, in the operation shown in A to C of FIG. 6, the control circuit 50 sets a cycle of the on/off of the switch element S32 (shown in A of FIG. 6) to twice of a cycle of the on/off of the switch elements S11 to S14 (shown in B and C of FIG. 6). In other words, if a cycle of the on/off of the switch elements S11 to S14 shown in B and C of FIG. 6 is the same as the operation shown in B and C of FIG. 4, a cycle of the on/off of the switch element S32 shown in A of FIG. 6 is twice the cycle of the on/off of the switch elements S11 to S14.

As shown in D of FIG. 6, the on/off switching of the switch elements S11 to S14 is accordingly performed one time for each of periods: a period during which the current I3 flows through the switch element S32; and a period during which it is stopped. In other words, the on/off switching of the switch elements S11 to S14 is performed one time for an ON period of the switch element S32, and also one time for an OFF period of the switch element S32.

In this case, as shown E and F of FIG. 6, a peak value of the current I1 flowing through the switch element S11 and a peak value of the current I2 flowing through the switch element S12 for an ON period of the switch element S32 are larger than a peak value of the current I1 and a peak value of the current I2 for an OFF period of the switch element S32, respectively. However, since the currents I1 and I2 flowing while the switch elements S11 and S12 are switched on/off one time are equal to each other, the peak values of the currents I1 and I2 for one-on/off switching of the switch elements S11 to S14 are almost equal.

As apparent from the above-mentioned operation, the cycle of the on/off of the switch element S32 is not limited to twice of the cycle of the on/off of the switch elements S11 to S14, as long as it is an even multiple of the cycle of the on/off of the switch elements S11 to S14. Note that, in the operations shown in A to F of FIG. 5, and A to F of FIG. 6, the cycle of the on/off of the switch element S32 is synchronized with the cycle of the on/off of the switch elements S11 to S14 (S21 to S24).

Figure 7:
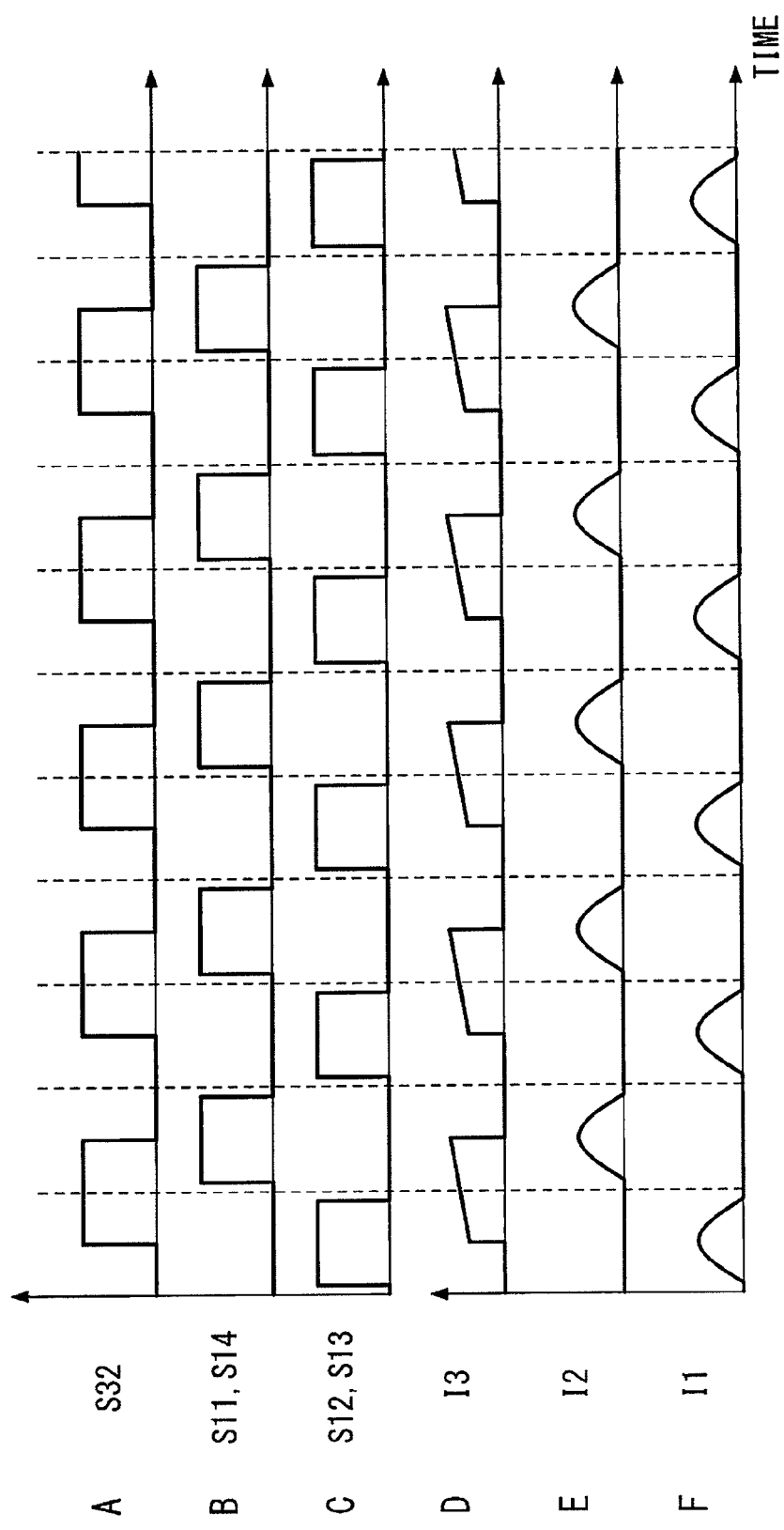
FIG. 7 (A to F of FIG. 7) is an explanatory drawing for yet another operation example of the power converter according to Embodiment 1.

The operation shown in A to C of FIG. 7 may be performed in order to allow the peak values of the respective currents I1 and I2 flowing through the switch elements S11 and S12 to be almost equal to each other. As shown in A to C of FIG. 7, an ON period of the switch element S32 is set across adjacent ON and OFF periods of each of the switch elements S12 and S13, and further across adjacent OFF and ON periods of each of the switch elements S11 and S14. Also, an OFF period of the switch element S32 is set across adjacent OFF and ON periods of each of the switch elements S12 and S13, and further across adjacent ON and OFF periods of each of the switch elements S11 and S14.

In addition, on/off timings of the switch elements S11 to S14 and S32 are set such that parts of ON periods of the switch elements S11 to S14 included in an ON period of the switch element S32 have the same length as parts of OFF periods thereof included in the ON period of the switch element S32. The on/off timings of the switch elements S11 to S14 and S32 are also set such that parts of ON periods of the switch elements S11 to S14 included in an OFF period of the switch element S32 have the same length as parts of OFF periods thereof included in the OFF period of the switch element S32.

In this operation, the cycle of the on/off of the switch elements S11 to S14 is equal to that of the switch element S32. In other words, the cycle of the on/off of the switch element S32 and the cycle of the on/off of the switch elements S11 to S14 have a relation in which phases thereof are different by 90 degrees.

Although not shown, the switch elements S21 to S24 are subjected to on/off switching at the same timing as the switch elements S11 to S14. Accordingly, the cycle of the on/off of the switch elements S21 to S24 is also equal to that of the switch element S32.

In this operation, as shown in D of FIG. 7, the current I3 flowing through the switch element S32 varies, and as shown in E and F of FIG. 7, a peak value of the current I1 flowing through the switch element S11 is almost equal to a peak value of the current I2 flowing through the switch element S12.

Figure 8:
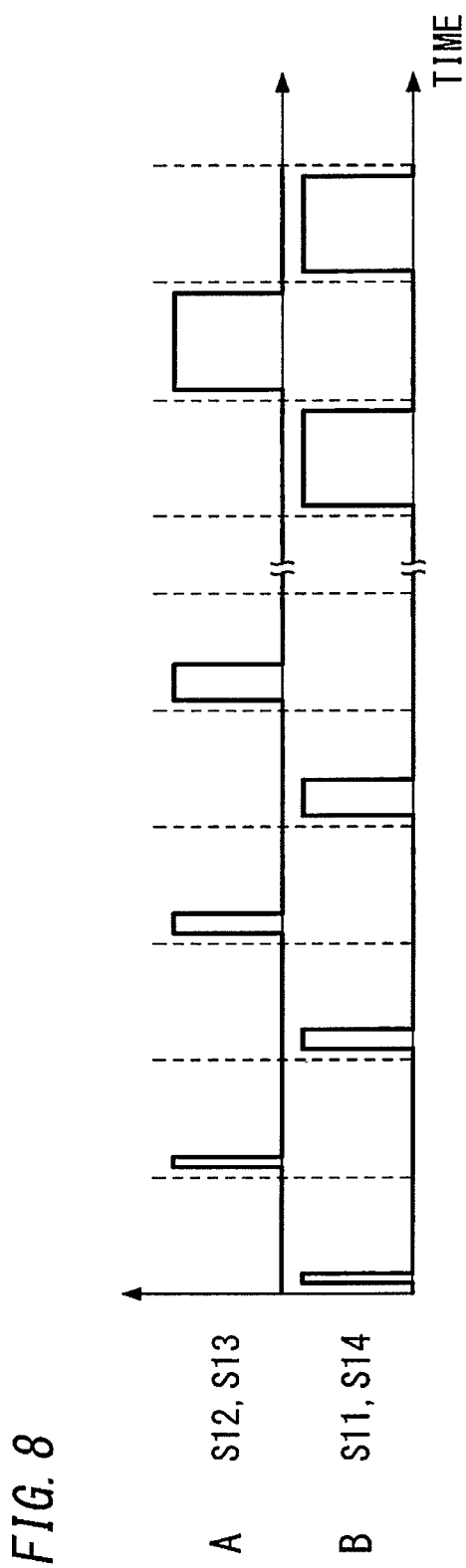
FIG. 8 (A and B of FIG. 8) is an explanatory drawing for yet still another operation example of the power converter according to Embodiment 1.

Since the power converter 1 with the above-mentioned configuration includes the capacitors C11 to C13, it is preferred to perform soft-start such that no inrush current flows upon starting. In other words, as shown in A and B of FIG. 8, it is preferred to gradually increase the duty ratio for the switch elements S11 to S14 (that is the same in the switch elements S21 to S24) in accordance with a lapse of time during a prescribed period immediately after starting so as to finally reach a value of the duty ratio in a normal operation.

As above, both of the first and second conversion circuits 10 and 20 are subjected to the soft-start of gradually increasing the duty ratios for the switch elements S11 to S14, and S21 to S24. Through this operation, it is possible to suppress occurrence of the inrush current to the capacitors C11 to C13 even when a voltage is applied to the first connection terminals X11 and X12, or the second connection terminals X21 and X22.

Through the above-mentioned configuration, the third conversion circuit 30 operates as a boosting circuit upon discharging of the battery B1, and a voltage applied across the first winding n1 of the transformer 40 is almost constant. On the other hand, upon charging of the battery B1, a voltage input from the DC bus to the second conversion circuit 20 is almost constant, and accordingly, a voltage applied across the second winding n2 of the transformer 40 is almost constant. In other words, an almost constant voltage is applied across each of the first and second windings n1 and n2 of the transformer 40 regardless of charging or discharging of the battery B1, and the design of a serial resonance circuit constituted by the capacitor C41 and the inductor L41 (setting of the resonance condition) therefore can be facilitated. As a result, it is possible to precisely perform the soft switching of the switch elements S11 to S14, and S21 to S24, and reduce the switching loss.

In this way, the conduction loss in the transformer 40 is reduced due to a reduction in a current flowing through the first winding n1 of the transformer 40 upon discharging of the battery B1, and the switching loss is reduced upon discharging of the battery B1, and accordingly, the loss as the whole of the power converter 1 can be reduced. With the above-mentioned configuration, a voltage that is input to the first conversion circuit 10 is made almost constant by the third conversion circuit 30 upon transferring electric power toward the second conversion circuit 20 from the first conversion circuit 10. On the other hand, a voltage that is input to the second conversion circuit 20 is almost constant upon transferring electric power toward the first conversion circuit 10 from the second conversion circuit 20. From this point, a voltage applied across each of the first and second windings n1 and n2 of the transformer 40 is almost constant regardless of a direction of transferring electric power, and the design of the serial resonance circuit of the inductor L41 and the capacitor C41 therefore can be facilitated. As a result, it is possible to optimize values of the inductor L41 and the capacitor C41 to minimize the loss.

As described above, the power converter 1 of the present embodiment includes the first conversion circuit 10, the second conversion circuit 20, the transformer 40, and the third conversion circuit 30. The first conversion circuit 10 and the second conversion circuit 20 are configured to perform electric power conversion. The transformer 40 is for transferring electric power between the first and second conversion circuits 10 and 20. The third conversion circuit 30 is a circuit provided at a pre-stage of the first conversion circuit 10 in a direction of transferring electric power toward the second conversion circuit 20 from the first conversion circuit 10. The third conversion circuit 30 is configured to perform voltage conversion such that a voltage to be input to the first conversion circuit 10 is higher than a voltage to be output from the second conversion circuit 20.

In the power converter 1, it is preferred that each of the first and second conversion circuits 10 and 20 be configured to perform bidirectional DC/AC power conversion. In this case, it is preferred that the power converter 1 have the following configuration. The third conversion circuit 30 is configured to operate as a boosting chopper circuit during a time period of transferring electric power toward the second conversion circuit 20 from the first conversion circuit 10. The third conversion circuit 30 is further configured to operate as a step-down chopper circuit during a time period of transferring electric power toward the first conversion circuit 10 from the second conversion circuit 20.

It is preferred that the power converter 1 further include the control circuit 50. It is preferred that each of the first and second conversion circuits 10 and 20 include the switch element (S11 to S14, S21 to S24) and be configured to perform the electric power conversion by the control circuit 50 controlling switching of the switch element. In this case, it is preferred that the power converter 1 have the following configuration. The third conversion circuit 30 includes the two first terminals x31 and x32 connected with the first conversion circuit 10, and the two second terminals x33 and x34. The third conversion circuit 30 further includes the series circuit formed of the first switch element S31 and the second switch element S32, and connected between the two first terminals x31 and x32. The third conversion circuit 30 further includes the series circuit formed of the inductor L31 and the first switch element S31, and connected between the two second terminals x33 and x34. One ends of the first switch element S31, the second switch element S32 and the inductor L31 are connected with one another. The control circuit 50 is configured to control on/off of the first switch element S31 upon transferring electric power toward the second conversion circuit 20 from the first conversion circuit 10. The control circuit 50 is configured to control on/off of the second switch element S32 upon transferring electric power toward the first conversion circuit 10 from the second conversion circuit 20.

In the power converter 1, it is preferred that the first and second conversion circuits 10 and 20 be subjected to switching control at a same timing.

In the power converter 1, it is preferred that during the time period of transferring electric power toward the first conversion circuit 10 from the second conversion circuit 20, the on/off of the second switch element S32 be controlled as follow. The on/off is preferably synchronized with the switching control to which the first and second conversion circuits 10 and 20 are subjected, and has a cycle that is 1/(an even number) of a cycle of the switching control.

In the power converter 1, it is preferred that during the time period of transferring electric power toward the first conversion circuit 10 from the second conversion circuit 20, the on/off of the second switch element S32 be controlled as follow. The on/off is preferably synchronized with the switching control to which the first and second conversion circuits 10 and 20 are subjected, and has a cycle that is an even multiple of a cycle of the switching control.

In the power converter 1, it is preferred that during the time period of transferring electric power toward the first conversion circuit 10 from the second conversion circuit 20, the on/off of the second switch element S32 be controlled as follow. The on/off preferably has a cycle that is equal to a synchronization cycle of switching control to which the first conversion circuit 10 is subjected, and the cycle of the on/off and the synchronization cycle of the switching control preferably have phases different by 90 degrees.

In the power converter 1, it is preferred that each of the first and second conversion circuits 10 and 20 be configured to increase a duty ratio for the switching control in accordance with a lapse of time during a prescribed period immediately after started.

In the power converter 1, it is preferred that the third conversion circuit 30 be subjected to feedback control to keep constant a voltage to be output from the second conversion circuit 20, when inputting electric power to the first conversion circuit 10 such that electric power is output from the second conversion circuit 20.

Embodiment 2

Figure 9:
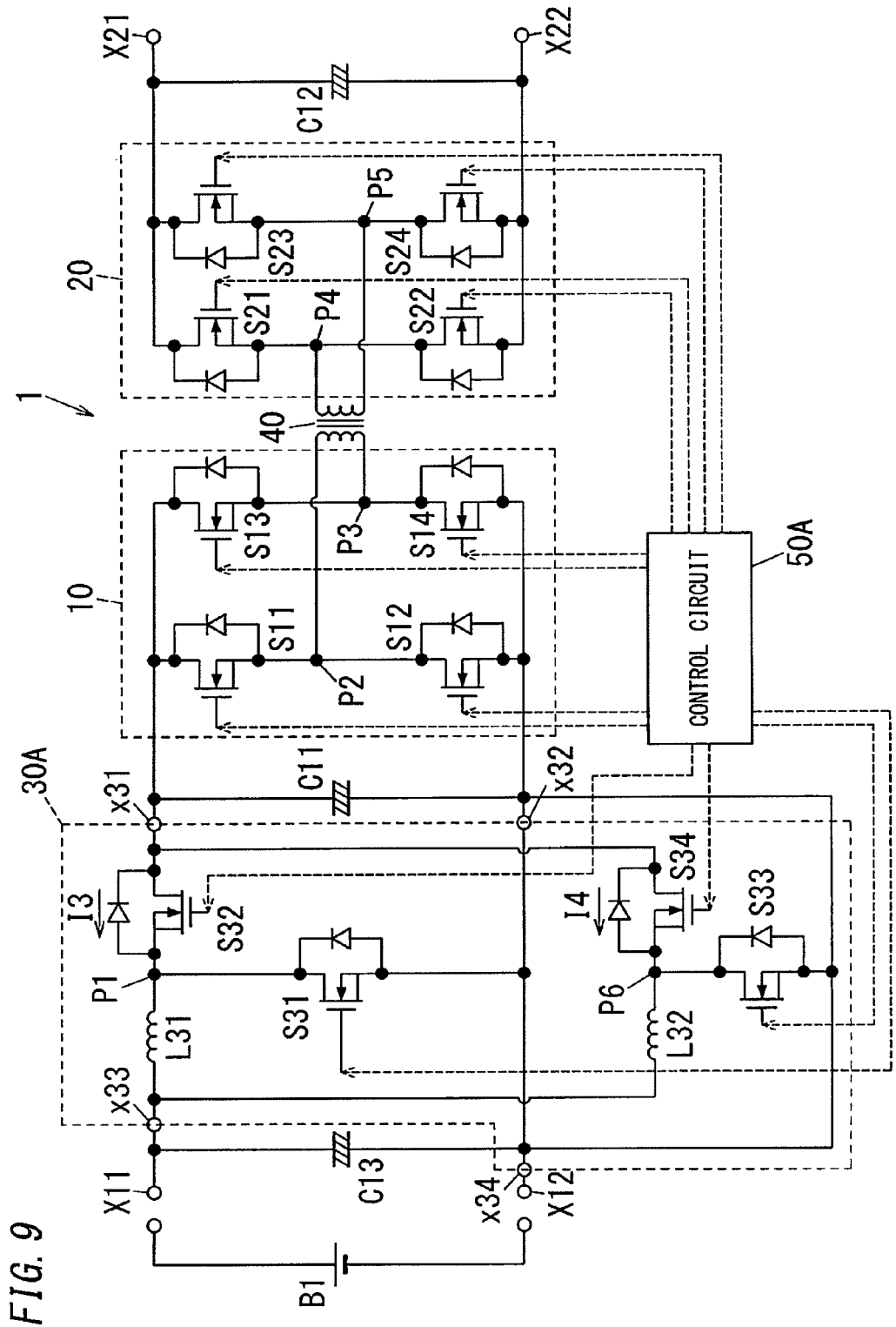
FIG. 9 is a circuit diagram illustrating a power converter according to Embodiment 2.

The operation described in Embodiment 1 makes the cycle of the on/off of the switch elements S11 to S14 and S21 to S24 of the first and second conversion circuits 10 and 20 be different from the cycle of the on/off of the switch element S32 of the third conversion circuit 30. The operation prevents unbalance between currents that flow through the switch elements S11 to S14 and S21 to S24 provided in the first and second conversion circuits 10 and 20. In order to achieve the same aim, a third conversion circuit 30A of the present embodiment has a configuration shown in FIG. 9.

In other words, the third conversion circuit 30A of the present embodiment has a configuration in which two circuits are connected in parallel, and each of the two circuits has the same configuration as that of the third conversion circuit 30 of Embodiment 1 shown in FIG. 1. One of the two circuits connected in parallel includes: two switch elements S31 and S32 connected in series; and an inductor L31 having one end connected with a connection point P1 of the switch elements S31 and S32. The other of the two circuits connected in parallel includes: two switch elements S33 and S34 connected in series; and an inductor L32 having one end connected with a connection point P6 of the switch elements S33 and S34. In the two circuits, both ends of the series circuit of the two switch elements S31 and S32, and both ends of the series circuit of the two switch elements S33 and S34 are connected with first terminals x31 and x32 in common. In addition, both ends of the series circuit of the switch element S31 and the inductor L31, and both ends of the series circuit of the switch element S33 and the inductor L32 are connected with second terminals x33 and x34 in common.

In the present embodiment, the switch element S31 corresponds to a first switch element, and the switch element S32 corresponds to a second switch element. In addition, the switch element S33 corresponds to a third switch element, and the switch element S34 corresponds to a fourth switch element. The inductor L31 corresponds to a first inductor, and the inductor L32 corresponds to a second inductor.

In a period during which a battery B1 is charged, on/off of the switch elements S32 and S34 is controlled by a control circuit 50A. In this case, the switch element S34 is controlled to be in OFF state for a period when the switch element S32 is in ON state, and on the other hand the switch element S34 is controlled to be in ON state for a period when the switch element S32 is in OFF state. In other words, interleaving is performed, in which one of two chopper circuits operates to be delayed with respect to the other by a ½ cycle. The switch elements S31 and S33 have the same specification. The switch elements S32 and S34 have the same specification. The inductors L31 and L32 have the same specification.

Figure 10:
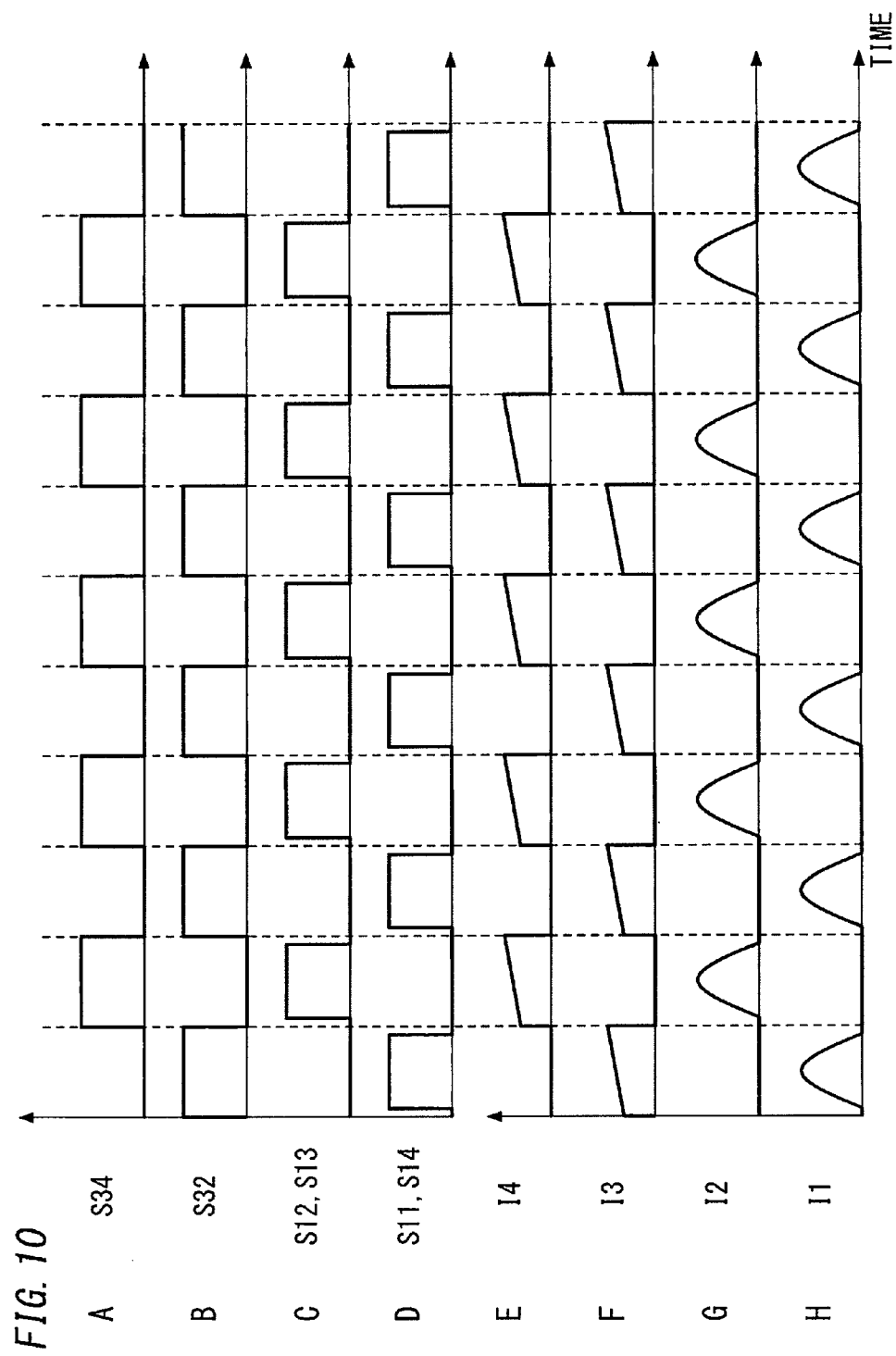
FIG. 10 (A to H of FIG. 10) is an operation explanatory drawing for the power converter according to Embodiment 2.

In the present embodiment, as shown in A and B of FIG. 10, on/off of the switch element S32 has a relation opposite to on/off of the switch element S34. For this reason, it is possible to suppress a change of a load on the first conversion circuit 10 for ON periods of the switch element S11 and ON periods of the switch element S12. In other words, as shown in F of FIG. 10, a current I3 flows through the inductor L31 for ON periods of the switch element S32, and as shown in E of FIG. 10, a current I4 flows through the inductor L32 for ON periods of the switch element S34.

As shown in A to D of FIG. 10, the control circuit 50A controls the switch elements S11 and S12 of the first conversion circuit 10 to be subjected to on/off switching at the same cycle as that of on/off of the switch elements S32 and S34. Although not shown, a cycle of on/off of the switch elements S11 to S14 is the same as that of the switch elements S21 to S24.

According to the above-mentioned operation, as shown in G and H of FIG. 10, a peak value of a current I1 flowing through the switch element S11 is equal to that of a current flowing through the switch element S12.

Thus, although the cycle of the on/off of the switch elements S11 to S14 and S21 to S24 is made to agree with that of the switch elements S32 and S34, it is possible to prevent unbalance between currents that flow through the switch elements S11 to S14. In addition, since the peak values of the currents I1 and I2 are suppressed, it is possible to relatively reduce design values of capacitances of capacitors C11 and C13. Because the other configurations and operations are similar to those of Embodiment 1, explanations thereof are omitted.

Figure 11:
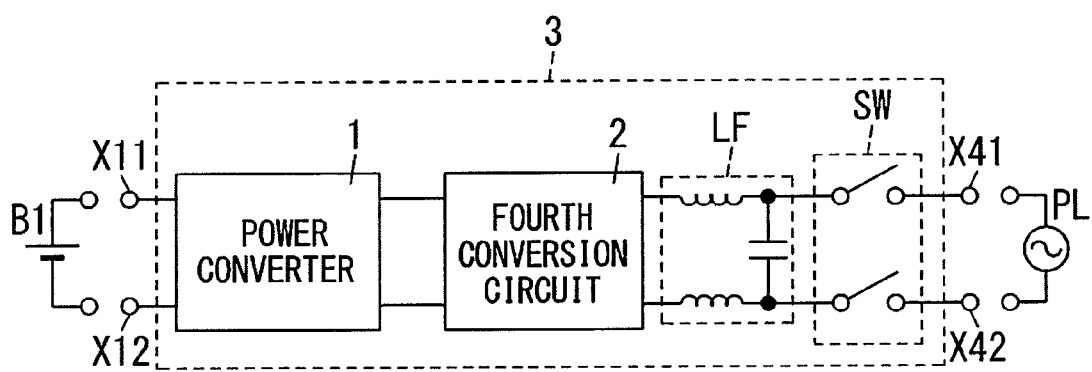
FIG. 11 is a block diagram illustrating a configuration example of a power conditioner including the power converter according to Embodiment 1 or 2.
Figure 12:
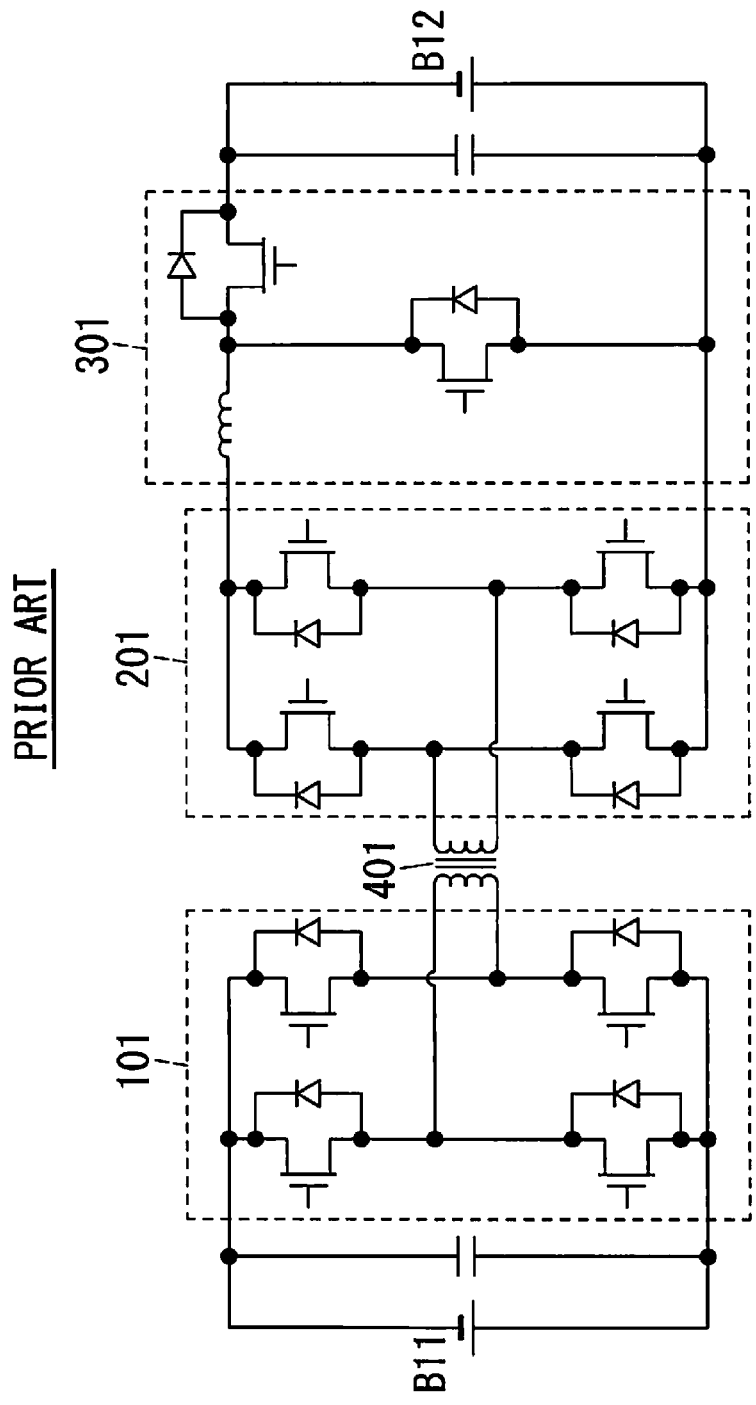
FIG. 12 is a circuit diagram illustrating a conventional example.

The power converter (bidirectional DC-DC converter) 1 according to Embodiment 1 or 2 may be used as a constituent element of a power conditioner 3 as shown in FIG. 11. The illustrated example is a configuration example of a storage apparatus with the battery (storage battery) B1, and a fourth conversion circuit 2 is added such that the power conditioner can be connected with power lines of an electric power grid PL. The fourth conversion circuit 2 is configured to perform bidirectional DC/AC power conversion.

The battery B1 is connected with the first connection terminals X11 and X12 provided in the power converter 1 of the power conditioner 3. The power conditioner 3 further includes connection terminals X41 and X42 for connecting to the power lines of the electric power grid PL. Further, a line filter LF and a switch SW are connected between the fourth conversion circuit 2 and the connection terminals X41 and X42. The line filter LF is for preventing noise, and the switch SW is for separating an electric circuit from the power lines of the electric power grid PL.

According to this configuration, charging and discharging of the battery B1 can be performed. In other words, the battery B1 can be charged with a power generation apparatus (not shown) connected with the power lines of the electric power grid PL, or with the electric power grid PL. Accordingly, it is possible to utilize the power stored in the battery B1 for an electric load(s) connected with the power lines of the electric power grid PL.

Note that, the above-mentioned embodiment is one example of the invention. For example, the first and second conversion circuits 10 and 20 are not respectively limited to the configurations that a bridge circuit with the four switch elements S11 to S14 and a bridge circuit with the four switch elements S21 to S24 are provided. The first and second conversion circuits 10 and 20 may be replaced with other well-known configurations, as long as they are configured to perform the bidirectional DC/AC power conversion.

As described above, it is preferred that this power converter 1 further include the control circuit 50A. It is preferred that each of the first and second conversion circuits 10 and 20 include the switch element (S11 to S14, S21 to S24), and be configured to perform the electric power conversion by the control circuit 50A controlling switching of the switch element. In this case, it is preferred that the power converter 1 be configured as follow. The third conversion circuit 30A includes: the two first terminals x31 and x32 connected with the first conversion circuit 10; and the two second terminals x33 and x34. The third conversion circuit 30A further includes the series circuit formed of the first switch element S31 and the second switch element S32, and connected between the two first terminals x31 and x32. The third conversion circuit 30A further includes the series circuit formed of the first inductor L31 and the first switch element S31, and connected between the two second terminals x33 and x34. The third conversion circuit 30A further includes the series circuit formed of the third switch element S33 and the fourth switch element S34, and connected between the two first terminals x31 and x32. The third conversion circuit 30A further includes the series circuit formed of the second inductor L32 and the third switch element S33, and connected between the two second terminals x33 and x34. One ends of the first switch element S31, the second switch element S32 and the first inductor L31 are connected with one another. One ends of the third switch element S33, the fourth switch element S34 and the second inductor L32 are connected with one another. The control circuit 50A is configured to control on/off of the first and third switch elements S31 and S33 upon transferring electric power toward the second conversion circuit 20 from the first conversion circuit 10. The control circuit 50A is configured to control on/off of the second and fourth switch elements S32 and S34 such that an ON period and an OFF period of the second switch element S32 have a relation opposite to a relation of an ON period and an OFF period of the fourth switch element S34 upon transferring electric power toward the first conversion circuit 10 from the second conversion circuit 20. The power conditioner 3 includes: the power converter 1 described in Embodiment 1 or 2; and the fourth conversion circuit 2 connected with the second conversion circuit 20 of the power converter 1. The fourth conversion circuit 2 is configured to perform bidirectional DC/AC power conversion.

In this way, the invention is not limited to the above-mentioned embodiments, and numerous modifications may be made in response to a design or the like without departing from scope of technical ideas according to the invention, even except for the above-mentioned embodiments.

The invention claimed is:

1. A power converter, comprising:
a first conversion circuit and a second conversion circuit configured to perform electric power conversion;
a transformer for transferring electric power between the first and second conversion circuits;
a third conversion circuit that is a circuit provided at a pre-stage of the first conversion circuit in a direction of transferring electric power toward the second conversion circuit from the first conversion circuit; and
a control circuit,
wherein:
each of the first and second conversion circuits is configured to perform bidirectional DC/AC power conversion;
the third conversion circuit is configured to operate as a boosting chopper circuit during a time period of transferring electric power toward the second conversion circuit from the first conversion circuit,
the third conversion circuit being configured to operate as a step-down chopper circuit during a time period of transferring electric power toward the first conversion circuit from the second conversion circuit; and
the control circuit is configured to control the first conversion circuit, the second conversion circuit and the third conversion circuit such that a voltage to be input to the first conversion circuit is higher than a voltage to be output from the second conversion circuit,
wherein each of the first and second conversion circuits comprises a switch element, and is configured to perform the electric power conversion by the control circuit controlling switching of the switch element,
wherein the third conversion circuit comprises:
two first terminals connected with the first conversion circuit;
two second terminals;
a series circuit formed of a first switch element and a second switch element, and connected between the two first terminals; and
a series circuit formed of an inductor and the first switch element, and connected between the two second terminals,
wherein one ends of the first switch element, the second switch element and the inductor are connected with one another,
wherein the control circuit is configured to control on/off of the first switch element upon transferring electric power toward the second conversion circuit from the first conversion circuit, and
wherein the control circuit is configured to control on/off of the second switch element upon transferring electric power toward the first conversion circuit from the second conversion circuit,
wherein the first and second conversion circuits are subjected to switching control at a same timing,
wherein:
during the time period of transferring electric power toward the first conversion circuit from the second conversion circuit, the on/off of the second switch element is synchronized with the switching control to which the first and second conversion circuits are subjected; and
the on/off of the second switch element has a cycle that is 1/(an even number) of a cycle of the switching control.

2. The power converter according to claim 1, wherein the third conversion circuit is subjected to feedback control to keep constant the voltage to be output from the second conversion circuit, when inputting electric power to the first conversion circuit such that electric power is output from the second conversion circuit.

3. A power conditioner, comprising:
the power converter according to claim 1; and
a fourth conversion circuit connected with the second conversion circuit of the power converter, the fourth conversion circuit being configured to perform bidirectional DC/AC power conversion.

4. A power converter, comprising:
a first conversion circuit and a second conversion circuit configured to perform electric power conversion;
a transformer for transferring electric power between the first and second conversion circuits;
a third conversion circuit that is a circuit provided at a pre-stage of the first conversion circuit in a direction of transferring electric power toward the second conversion circuit from the first conversion circuit; and
a control circuit,
wherein:
each of the first and second conversion circuits is configured to perform bidirectional DC/AC power conversion;
the third conversion circuit is configured to operate as a boosting chopper circuit during a time period of transferring electric power toward the second conversion circuit from the first conversion circuit,
the third conversion circuit being configured to operate as a step-down chopper circuit during a time period of transferring electric power toward the first conversion circuit from the second conversion circuit; and the control circuit is configured to control the first conversion circuit, the second conversion circuit and the third conversion circuit such that a voltage to be input to the first conversion circuit is higher than a voltage to be output from the second conversion circuit, wherein each of the first and second conversion circuits comprises a switch element, and is configured to perform the electric power conversion by the control circuit controlling switching of the switch element, wherein the third conversion circuit comprises:
two first terminals connected with the first conversion circuit;
two second terminals;
a series circuit formed of a first switch element and a second switch element, and connected between the two first terminals; and
a series circuit formed of an inductor and the first switch element, and connected between the two second terminals, wherein one ends of the first switch element, the second switch element and the inductor are connected with one another, wherein the control circuit is configured to control on/off of the first switch element upon transferring electric power toward the second conversion circuit from the first conversion circuit, and wherein the control circuit is configured to control on/off of the second switch element upon transferring electric power toward the first conversion circuit from the second conversion circuit, wherein the first and second conversion circuits are subjected to switching control at a same timing, wherein:
during the time period of transferring electric power toward the first conversion circuit from the second conversion circuit, the on/off of the second switch element is synchronized with the switching control to which the first and second conversion circuits are subjected; and
the on/off of the second switch element has a cycle that is an even multiple of a cycle of the switching control.

5. The power converter according to claim 4, wherein the third conversion circuit is subjected to feedback control to keep constant the voltage to be output from the second conversion circuit, when inputting electric power to the first conversion circuit such that electric power is output from the second conversion circuit.

6. A power conditioner, comprising:
the power converter according to claim 4; and
a fourth conversion circuit connected with the second conversion circuit of the power converter, the fourth conversion circuit being configured to perform bidirectional DC/AC power conversion.

7. A power converter, comprising:
a first conversion circuit and a second conversion circuit configured to perform electric power conversion;
a transformer for transferring electric power between the first and second conversion circuits;
a third conversion circuit that is a circuit provided at a pre-stage of the first conversion circuit in a direction of transferring electric power toward the second conversion circuit from the first conversion circuit; and
a control circuit, wherein:
each of the first and second conversion circuits is configured to perform bidirectional DC/AC power conversion;
the third conversion circuit is configured to operate as a boosting chopper circuit during a time period of transferring electric power toward the second conversion circuit from the first conversion circuit,
the third conversion circuit being configured to operate as a step-down chopper circuit during a time period of transferring electric power toward the first conversion circuit from the second conversion circuit; and
the control circuit is configured to control the first conversion circuit, the second conversion circuit and the third conversion circuit such that a voltage to be input to the first conversion circuit is higher than a voltage to be output from the second conversion circuit, wherein each of the first and second conversion circuits comprises a switch element, and is configured to perform the electric power conversion by the control circuit controlling switching of the switch element, wherein the third conversion circuit comprises:
two first terminals connected with the first conversion circuit;
two second terminals;
a series circuit formed of a first switch element and a second switch element, and connected between the two first terminals; and
a series circuit formed of an inductor and the first switch element, and connected between the two second terminals, wherein one ends of the first switch element, the second switch element and the inductor are connected with one another, wherein the control circuit is configured to control on/off of the first switch element upon transferring electric power toward the second conversion circuit from the first conversion circuit, and wherein the control circuit is configured to control on/off of the second switch element upon transferring electric power toward the first conversion circuit from the second conversion circuit, wherein:
during the time period of transferring electric power toward the first conversion circuit from the second conversion circuit, the on/off of the second switch element has a cycle that is equal to a synchronization cycle of switching control to which the first conversion circuit is subjected; and
the cycle of the on/off of the second switch element and the synchronization cycle of the switching control have phases different by 90 degrees.

8. The power converter according to claim 7, wherein the third conversion circuit is subjected to feedback control to keep constant the voltage to be output from the second conversion circuit, when inputting electric power to the first conversion circuit such that electric power is output from the second conversion circuit.

9. A power conditioner, comprising:
the power converter according to claim 7; and
a fourth conversion circuit connected with the second conversion circuit of the power converter, the fourth conversion circuit being configured to perform bidirectional DC/AC power conversion.

10. A power converter, comprising:
a first conversion circuit and a second conversion circuit configured to perform electric power conversion;
a transformer for transferring electric power between the first and second conversion circuits;
a third conversion circuit that is a circuit provided at a pre-stage of the first conversion circuit in a direction of transferring electric power toward the second conversion circuit from the first conversion circuit; and
a control circuit,
wherein:
each of the first and second conversion circuits is configured to perform bidirectional DC/AC power conversion;
the third conversion circuit is configured to operate as a boosting chopper circuit during a time period of transferring electric power toward the second conversion circuit from the first conversion circuit,
the third conversion circuit being configured to operate as a step-down chopper circuit during a time period of transferring electric power toward the first conversion circuit from the second conversion circuit; and
the control circuit is configured to control the first conversion circuit, the second conversion circuit and the third conversion circuit such that a voltage to be input to the first conversion circuit is higher than a voltage to be output from the second conversion circuit,
wherein each of the first and second conversion circuits comprises a switch element, and is configured to perform the electric power conversion by the control circuit controlling switching of the switch element,
wherein the third conversion circuit comprises:
two first terminals connected with the first conversion circuit;
two second terminals;
a series circuit formed of a first switch element and a second switch element, and connected between the two first terminals;
a series circuit formed of a first inductor and the first switch element, and connected between the two second terminals;
a series circuit formed of a third switch element and a fourth switch element, and connected between the two first terminals; and
a series circuit formed of a second inductor and the third switch element, and connected between the two second terminals,
wherein one ends of the first switch element, the second switch element and the first inductor are connected with one another,
wherein one ends of the third switch element, the fourth switch element and the second inductor are connected with one another,
wherein the control circuit is configured to control on/off of the first and third switch elements upon transferring electric power toward the second conversion circuit from the first conversion circuit, and
wherein the control circuit is configured to control on/off of the second and fourth switch elements such that an ON period and an OFF period of the second switch element have a relation opposite to a relation of an ON period and an OFF period of the fourth switch element upon transferring electric power toward the first conversion circuit from the second conversion circuit.

11. The power converter according to claim 10, wherein the third conversion circuit is subjected to feedback control to keep constant the voltage to be output from the second conversion circuit, when inputting electric power to the first conversion circuit such that electric power is output from the second conversion circuit.

12. A power conditioner, comprising:
the power converter according to claim 10; and
a fourth conversion circuit connected with the second conversion circuit of the power converter, the fourth conversion circuit being configured to perform bidirectional DC/AC power conversion.

13. A power converter, comprising:
a first conversion circuit and a second conversion circuit configured to perform electric power conversion;
a transformer for transferring electric power between the first and second conversion circuits;
a third conversion circuit that is a circuit provided at a pre-stage of the first conversion circuit in a direction of transferring electric power toward the second conversion circuit from the first conversion circuit; and
a control circuit,
wherein:
each of the first and second conversion circuits is configured to perform bidirectional DC/AC power conversion;
the third conversion circuit is configured to operate as a boosting chopper circuit during a time period of transferring electric power toward the second conversion circuit from the first conversion circuit,
the third conversion circuit being configured to operate as a step-down chopper circuit during a time period of transferring electric power toward the first conversion circuit from the second conversion circuit; and
the control circuit is configured to control the first conversion circuit, the second conversion circuit and the third conversion circuit such that a voltage to be input to the first conversion circuit is higher than a voltage to be output from the second conversion circuit,
wherein each of the first and second conversion circuits comprises a switch element, and is configured to perform the electric power conversion by the control circuit controlling switching of the switch element,
wherein the third conversion circuit comprises:
two first terminals connected with the first conversion circuit;
two second terminals;
a series circuit formed of a first switch element and a second switch element, and connected between the two first terminals; and
a series circuit formed of an inductor and the first switch element, and connected between the two second terminals,
wherein one ends of the first switch element, the second switch element and the inductor are connected with one another,
wherein the control circuit is configured to control on/off of the first switch element upon transferring electric power toward the second conversion circuit from the first conversion circuit, and
wherein the control circuit is configured to control on/off of the second switch element upon transferring electric power toward the first conversion circuit from the second conversion circuit,
wherein the first and second conversion circuits are subjected to switching control at a same timing,
wherein each of the first and second conversion circuits is configured to increase a duty ratio for the switching control in accordance with a lapse of time during a prescribed period immediately after started.

14. The power converter according to claim 13, wherein the third conversion circuit is subjected to feedback control to keep constant the voltage to be output from the second conversion circuit, when inputting electric power to the first conversion circuit such that electric power is output from the second conversion circuit.

15. A power conditioner, comprising:
   the power converter according to claim 13; and
   a fourth conversion circuit connected with the second conversion circuit of the power converter, the fourth conversion circuit being configured to perform bidirectional DC/AC power conversion.

\* \* \* \* \*